2,807,533

SILVER RECOVERY METHOD

Helmer A. Abramson, Hancock, Mich., assignor to Calumet and Hecla, Inc., Calumet, Mich., a corporation of Michigan No Drawing. Application May 21, 1956,
Serial No. 585,928

7 Claims. (Cl. 75—2)

The present invention relates to the recovery of silver from copper sulfide materials. In a more specific sense, it relates to an economical process in which silver, occurring as the finely divided native metal in copper sulfide flotation concentrates is recovered in high yields as a silver concentrate essentially free of copper by a leaching-flotation method.

The conventional method for recovering silver in copper sulfide ores is a many-step operation which involves matte smelting to recover copper followed by electrolysis of the copper, and simultaneously freeing the silver collected by the copper matte produced in the first step in the succeeding operation and recovering it as metal from the residue remaining in the electrolytic tanks. Copper matte, a copper-iron-sulfur product, which acts as a collector for the silver as well as a means of concentrating the copper, is partially refined to an impure form called "blister" copper which likewise contains all the silver recovered from the ore. The impure "blister" is cast into anodes which are electrolyzed to produce pure electrolytic grade copper. The silver which is not deposited along with the copper by the electrolysis is recovered by an involved purification process from the slime which collects in the tank.

Another method for recovering silver in sulfide copper ore concentrates involves leaching the finely divided concentrates in an aqueous ammoniacal solution in the presence of air or other oxygen-containing gas to dissolve the copper, and recovering the silver by flotation of the filtered and washed tailings, which contain essentially all of the original silver values because metallic silver has been found to be unaffected by ammonia leaching solutions. It would appear fairly simple to carry out the above steps and by elimination of a high percentage of the gangue through such flotation to recover silver as a high grade concentrate which could be treated in a smelter for silver metal recovery. For example, leaching could be used to lower the copper content in the tailing to the optimum value for flotation and silver recovery. There are difficulties in carrying out such an operation, however. The concentrates are very finely ground particles, are easily floated and form a froth in the leaching medium when subjected to aeration and, therefore, leach very slowly because they are kept out of contact with the leaching solution. Although certain agents, called depressants, may be added to the concentrate slurry to remedy this condition, their use is costly.

It has now been discovered in accordance with the present invention that by omitting the foam depressant and removing the foam formed during the dissolving of the copper sulfide, silver can be floated by the foam hitherto considered undesirable and thus separated from the remaining metal values in a fraction which has a higher percentage of silver than the material to be treated and the silver and copper values of which can be recovered in well known manner.

The contemporaneous leaching and separation of a froth rich in silver might be termed a leaching-flotation step. The silver-rich froth may be removed and treated with a froth depressant in a separate vessel and a valuable silver concentrate obtained therefrom after carrying on the recovery of copper values by conventional leaching of the solid material floated in the froth.

By means of the "leaching-flotation" a considerable, even a major percentage of the silver and a lesser percentage of the copper values are recovered in the froth which forms when, for example, copper sulfide flotation concentrates containing chalcocite are agitated in the presence of air in ammoniacal leaching solutions such as aqueous, ammoniacal, ammonium carbonate solution. Upon removing the copper which is present in the foam, by a leaching operation, a silver concentrate is obtained without a further flotation step. If desired, however, the grade of concentrate (percent silver) may be increased by a further flotation.

The silver remaining in the "sink" or unfloated portion is recovered by subjecting the tailings, after leaching in ammoniacal solution to remove the copper, to conventional flotation with the use of added flotation agents.

The combined concentrates recovered in the leaching-flotation and the conventional flotation steps on the "sink" leach tailings, after leaching has removed the copper, contain a high percentage of the silver originally present in the feed. As no silver dissolves in ammoniacal leaching solutions, flotation processes can operate on the highest possible silver content material, further concentrated by removal of copper and sulfur in leaching. The silver values have proved to be amenable to flotation with correspondingly high recoveries being possible. In one conventional flotation test on leached tailings, it was shown that 93% of the silver had been recovered. The concentrate, obtained in this test, was a silver-rich product assaying 100 ounces per ton.

A desirable silver concentrate would be one which would contain a high silver percentage and little or no copper. Such a product might possibly be treated in a silver recovery circuit by smelting and would be expected to bring greater returns for the silver contained than one which would contain excessive copper and, consequently, would have to go to a copper circuit for prior removal of copper. To obtain more desirable silver concentrates by flotation of leaching tailings the product of the flotation of silver from the tailings may be releached, to further reduce the copper content, which is also concentrated by flotation, and then refloated to improve the silver grade. This operation may be repeated as often as desired, to the extent that economic benefits accrue. To indicate the possibility of decreasing the copper content, in one test a tailing of 0.3% copper was obtained after leaching original concentrates.

A solution originally containing no dissolved copper has been found to be more effective in concentrating silver in the "leaching-flotation" step than one containing 20 grams per liter of dissolved copper. Previous tests have shown that the first 50% of the copper contained in chalcocite ores, in which the copper is in the form of cuprous sulfide, or $Cu_2S$, leaches very rapidly in ammoniacal solutions when agitated in the presence of air. The so-called original 50% of the copper dissolves during the short period of time which is required for the froth to be formed and removed in the "leaching-flotation" step. The leaching cycles for the dissolution of the remaining 50% of the copper must be increased to allow the comparatively slower rate to complete the copper removal. In these cycles, solutions containing dissolved copper are of advantage because copper acts as a catalyst in increasing the solution rate as disclosed in U. S. Patent No. 2,727,819 of Kenney et al. The solution after the froth collection stage has sufficient capacity to dissolve the remaining copper from the "sink" portion, or unfrothed solids, so that, in batch operation, if desired, leaching may be completed in the same apparatus without the removal of solids. Preferred concentrations are as follows:

Quantities are stated in grams per liter of solution.

$NH_3$ — 40 to 200, preferably 60 to 120.
$CO_2$ — 15 to 100, preferably 20 to 50.
Cu (dissolved) — up to 100, preferably up to 50.
Copper sulfide (solid phase) — 2 to 100, preferably 10 to 50.

$O_2$ (air or oxygen) is passed in at a rate to cause suspension of the solid material and ordinarily at least 2½ and preferably 3 or more atoms of oxygen per atom of copper in the copper sulfide material being treated. (As an example, 1.56 liters per minute per liter of solution containing initially 15 grams per liter of copper in copper sulfide.) In the case of the batch operation, the copper concentration will ordinarily be built up sufficiently in the first stage for most efficient dissolving in the second stage and in the case of the continuous operation in which the leaching can be carried out in two vessels, that which is used for leaching out the first 50% of the copper is kept low in copper content. In either case, the concentrate may be contacted with a leach solution initially low in copper, preferably less than 5 grams per liter during the removal of froth which corresponds to the solution of the first 50% of the copper content thereof. The froth, after removal and treatment with depressants, is leached in a separate operation for which solution from the previous leaching-flotation step may be effectively used. However, fresh solutions adjusted to the optimum concentrations of copper and sulfur compounds may be employed, if desired, to obtain the advantage of faster solution rates than partially saturated unadjusted solutions from previous steps in the process. The disadvantage resulting from their use is in the higher cost of recovering copper from the resulting leaner rich solutions in the distillation step, as less copper is recovered per unit of volume distilled than from richer solutions.

In one test, undried flotation concentrates containing 30% copper and 11 ounces per ton silver were added to leaching solutions, in the proportion of one of solids to five of liquid, at a temperature of about 40–50° C. The solution initially contained no dissolved copper, 120 grams per liter ammonia and 50 grams per liter carbon dioxide as ammonium carbonate and free ammonia. Air was bubbled through the slurry contained in a vertical cylindrical container through an air dispersion device located in the bottom, at a rate sufficient to maintain the ore in suspension and to cause froth to form. (The froth could be recovered in a leaching apparatus, and after mixing with a sufficient amount of a depressing agent such as American Cyanamide Reagent 610, at the rate of 1.4 lb. per ton, could be leached in a conventional manner in the presence of air.) In this test 25% of the weight of the original concentrate containing 67% of the silver and 33% of the copper (calculated) was recovered from the froth. The corresponding "sink" portion represented 54% of the weight and contained 33% of the silver and 11% of the copper. The balance of the copper and a trace of silver were present in the leaching solution.

It can be seen from the foregoing that a substantial saving of reagents is realized by employing the described method. In the first place it is necessary to treat only that portion of the initial charge of solids which comes off as froth, with froth depressing agents, to effect satisfactory leaching. This portion represents about 25% of the original weight of the concentrates. Secondly, it is only the "sink" portion which requires the addition of flotation agents to recover the contained silver. As the weight of "sink" material is only 80% of that obtained if no froth were removed, a saving of 20% in reagents for flotation is indicated on the basis of the above test.

The following examples will serve to illustrate the invention:

| | A | B | C | D |
|---|---|---|---|---|
| Solution in ml | 250 | 250 | 250 | 250 |
| Concentrate, grams, dry basis | 50 | 50 | 51.5 | 51.5 |
| Temperature, ° C | 40–50 | 40–50 | 60 | 60 |
| Aeration rate, liters/minute | 0.3 | 0.3 | 0.3 | 0.3 |
| Leaching-flotation time, min | (1) | (1) | (1) | (1) |
| Copper in leach solution initially, g./l. | 0 | 20 | 0.3 | 0 |
| Ammonia in leach solution initially, g./l. | 120 | 120 | 120 | 0 |
| Carbon dioxide in leach solution initially, g./l. | 50 | 50 | 50 | 0 |
| Silver in "sink," wt. percent of total silver | 33 | 56 | (3) | (3) |
| Silver in froth, wt. percent of total silver | (2) | (2) | (3) | (3) |
| Silver in rich solution, wt. percent of total silver | (2) | (2) | (2) | (2) |
| Copper in "sink," wt. percent of total copper | 11 | 17 | 17 | 92 |
| Copper in froth, wt. percent of total copper | 33 | 29 | 21 | (2) |
| Copper in rich solution, wt. percent of total copper | 54 | 52 | 62 | 0 |
| Weight of "sink," percent of orig. concentrates | 54 | 59 | 57 | 98.6 |
| Weight of froth, percent of orig. concentrates | 25 | 22 | 17 | 1.3 |
| Silver in original concentrates, grams per 1,000 kg. | 377 | 377 | 377 | 377 |

¹ Sufficient time to complete the removal of froth—approx. 30 minutes.
² Values calculated by difference and/or based upon the assumption that no silver dissolves, an assumption which has been found to be approximately correct.
³ Percentage of total silver recovered in froth plus "sink."

By reference to the above table it will be seen that best results were had when the original leach solution contained no copper. Compare Examples A and B. Again, by comparing samples C and D it is seen that omission of the leachant compounds results in that very little silver is lifted and, for that matter, also very little copper.

From the foregoing it will be clear that by the above described invention an improved process has been provided for recovery of silver and copper values from copper sulfide ores containing native silver and while the above description sets forth the present preferred embodiments of the invention, it is to be understood that changes can be made and that the invention is not intended to be limited by the foregoing specifications except in accordance with the scope of the claims appended hereto and of the prior art.

What I claim is:

1. A process for recovery of copper and silver values from finely divided copper sulfide ore concentrate containing native silver, said process comprising the steps of contacting said concentrate with a solution of aqueous, ammoniacal, ammonium carbonate leach solution substantially free from added froth depressant and substantially free from added frothing agent, maintaining said ore in suspension in said solution while passing an oxygen-containing gas therethrough whereby to dissolve copper values from said ore and at the same time form a froth rich in silver in the form of solid particles, collecting and removing said froth with its solid silver content and recovering copper and silver values therefrom and recovering copper values from said solution.

2. The process as defined in claim 1 wherein further the initial copper content of the leach solution is less than five grams per liter.

3. The process as defined in claim 1 wherein further the initial copper content of the leach solution is less than one gram per liter.

4. The process defined in claim 3 wherein further said leach solution contains from 40 to 200 grams per liter of $NH_3$ and from 15 to 100 grams per liter of $CO_2$.

5. The process defined in claim 1 wherein further said leach solution contains 40 to 200 grams per liter of $NH_3$ and from 15 to 100 grams per liter of $CO_2$.

6. A process for recovery of copper and silver values from finely divided copper sulfide ore concentrate containing native silver, said process comprising the steps of contacting said concentrate with a solution of aqueous, ammoniacal, ammonium carbonate leach solution substantially free from added froth depressant and substantially free from added frothing agent, maintaining said ore in suspension in said solution while passing an oxygen-containing gas therethrough whereby to dissolve copper values from said ore and at the same time form a froth rich in silver in the form of solid particles, continuing to maintain said ore in suspension and to pass said gas into said leach solution until at least about 50 percent of the copper in said concentrate has been dissolved, collecting and removing said froth with its solid silver content and recovering copper and silver values therefrom and recovering copper values from said solution.

7. The process defined in claim 6 wherein further said leach solution contains from 40 to 200 grams per liter of $NH_3$ and from 15 to 100 grams per liter of $CO_2$.

References Cited in the file of this patent

UNITED STATES PATENTS

| | | |
|---|---|---|
| 1,530,496 | Isham | Mar. 24, 1925 |
| 2,687,953 | Kenny et al. | Aug. 31, 1954 |
| 2,693,404 | Mackiw | Nov. 2, 1954 |
| 2,698,220 | Erskine | Dec. 28, 1954 |
| 2,727,818 | Kenny et al. | Dec. 20, 1955 |
| 2,727,819 | Kenny et al. | Dec. 20, 1955 |

UNITED STATES PATENT OFFICE
Certificate of Correction

Patent No. 2,807,533                    September 24, 1957

Helmer A. Abramson

It is hereby certified that error appears in the printed specification of the above numbered patent requiring correction and that the said Letters Patent should read as corrected below.

Column 4, in the table, second column, under the heading "A", after "$^{(2)}$", first occurrence, insert —67—; under the same heading, after "$^{(2)}$", second occurrence, insert —0—; same table, third column, under the heading "B", after "$^{(2)}$", first occurrence, insert —44—; under the same heading, after "$^{(2)}$", second occurrence, insert —0—; same table, fourth column, under the heading "C", after "$^{(3)}$", first occurrence, insert —52—; under the same heading, after "$^{(3)}$", second occurrence, insert —48—; under the same heading, after "$^{(2)}$", insert —0—; same table, fifth column, under the heading "D", after "$^{(3)}$", first occurrence, insert —91—; under the same heading, after "$^{(3)}$", second occurrence, insert —9—; under the same heading, after "$^{(2)}$", first occurrence, insert —0—; under the same heading, after "$^{(2)}$", second occurrence, insert —8—.

Signed and sealed this 3rd day of December 1957.

[SEAL]

Attest:
KARL H. AXLINE,
*Attesting Officer.*

ROBERT C. WATSON,
*Commissioner of Patents.*